B. BOUDA.
APPARATUS FOR CLEANING POULTRY.
APPLICATION FILED OCT. 4, 1920.
1,372,595.
Patented Mar. 22, 1921.
3 SHEETS—SHEET 1.
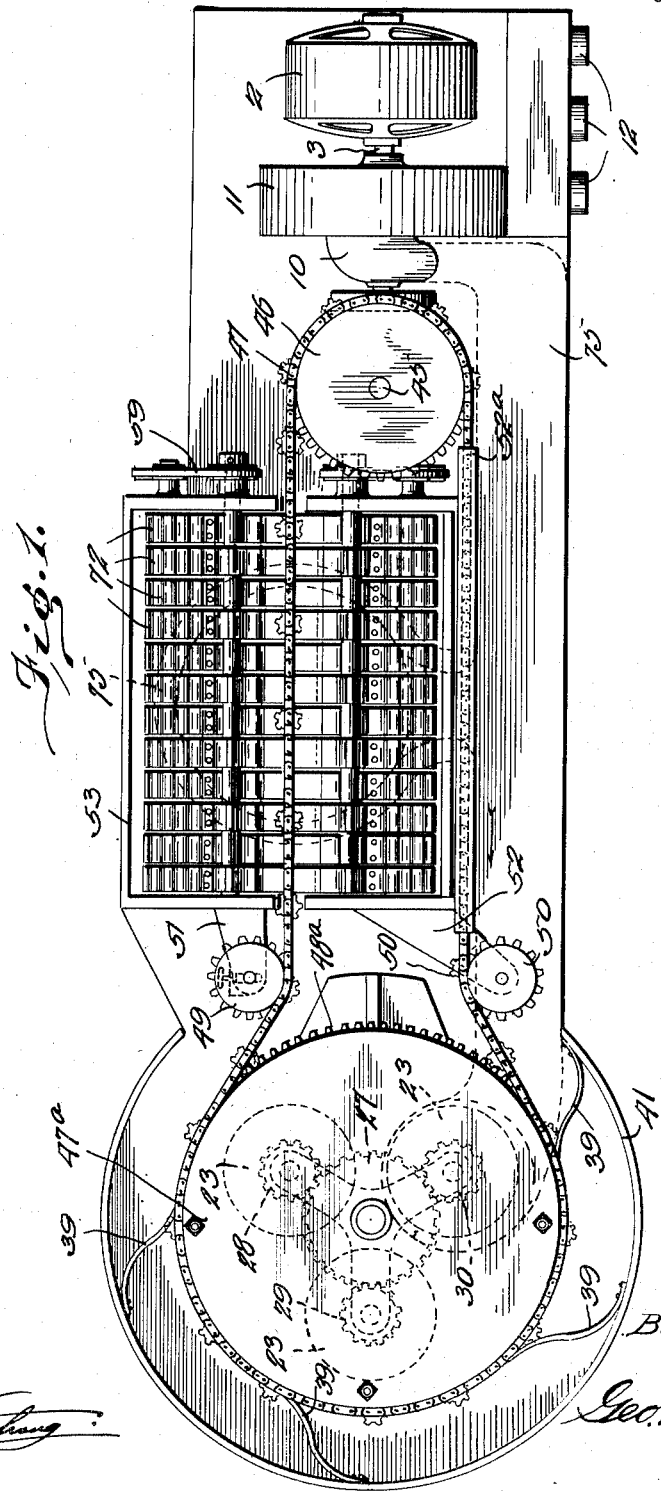
INVENTOR.
B. Bouda.
Geo. P. Kimmel.
ATTORNEY.

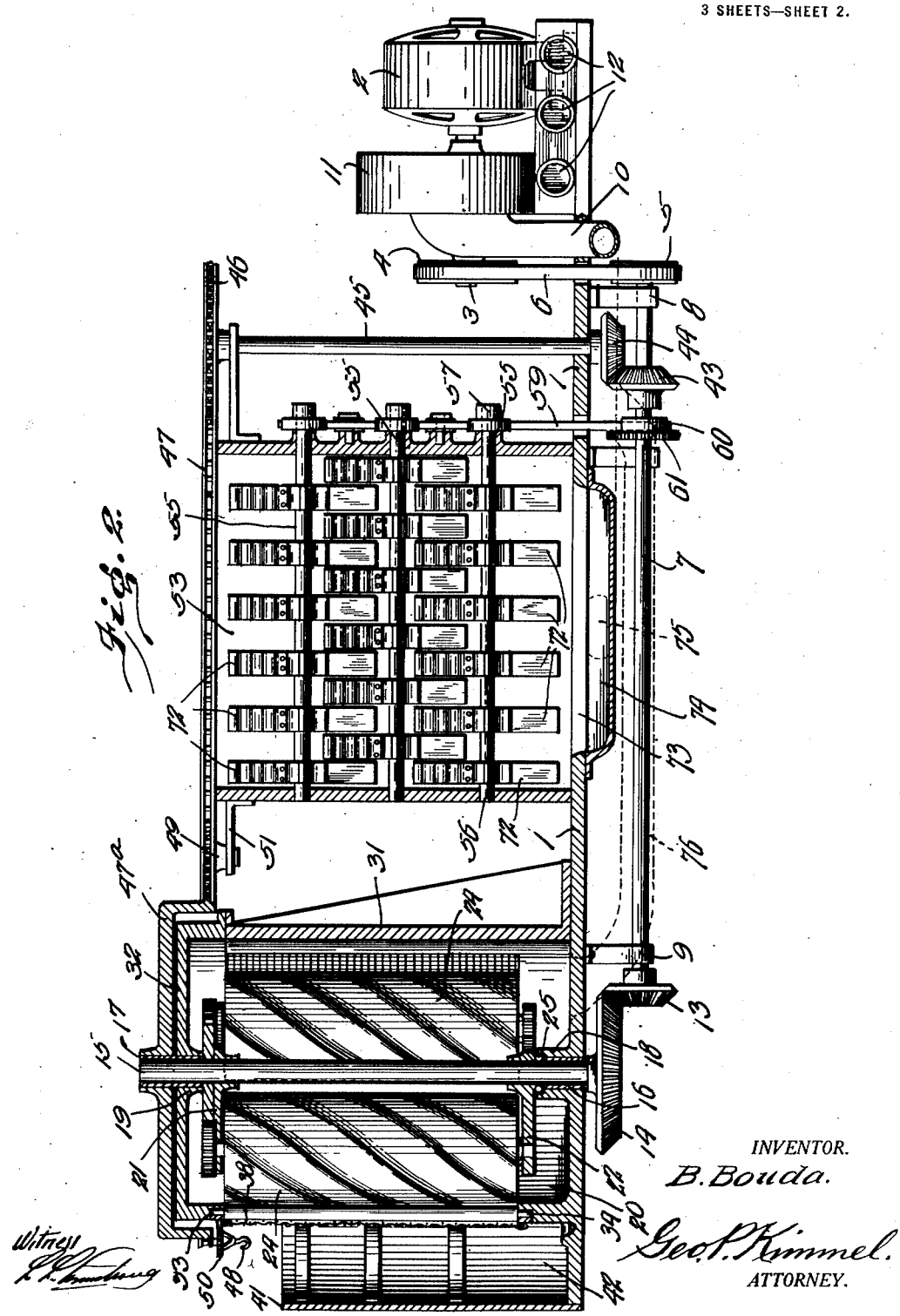

B. BOUDA.
APPARATUS FOR CLEANING POULTRY.
APPLICATION FILED OCT. 4, 1920.
1,372,595.
Patented Mar. 22, 1921.
3 SHEETS—SHEET 3.
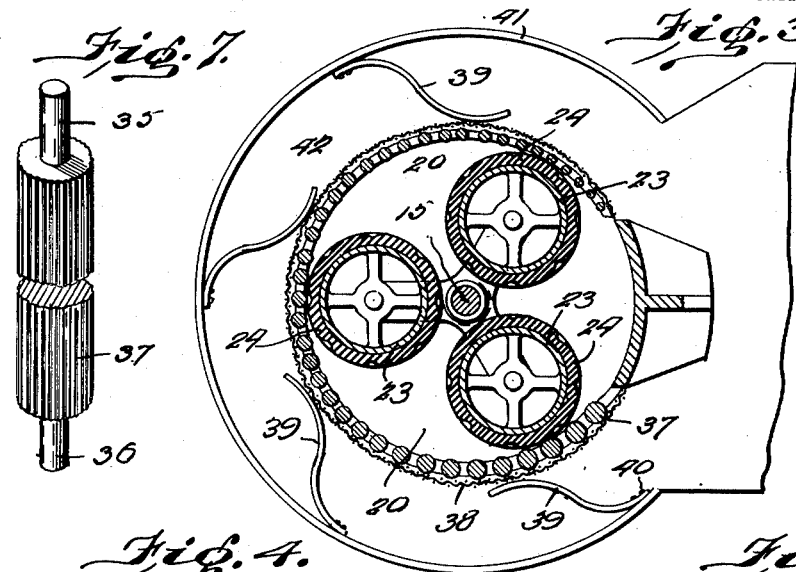
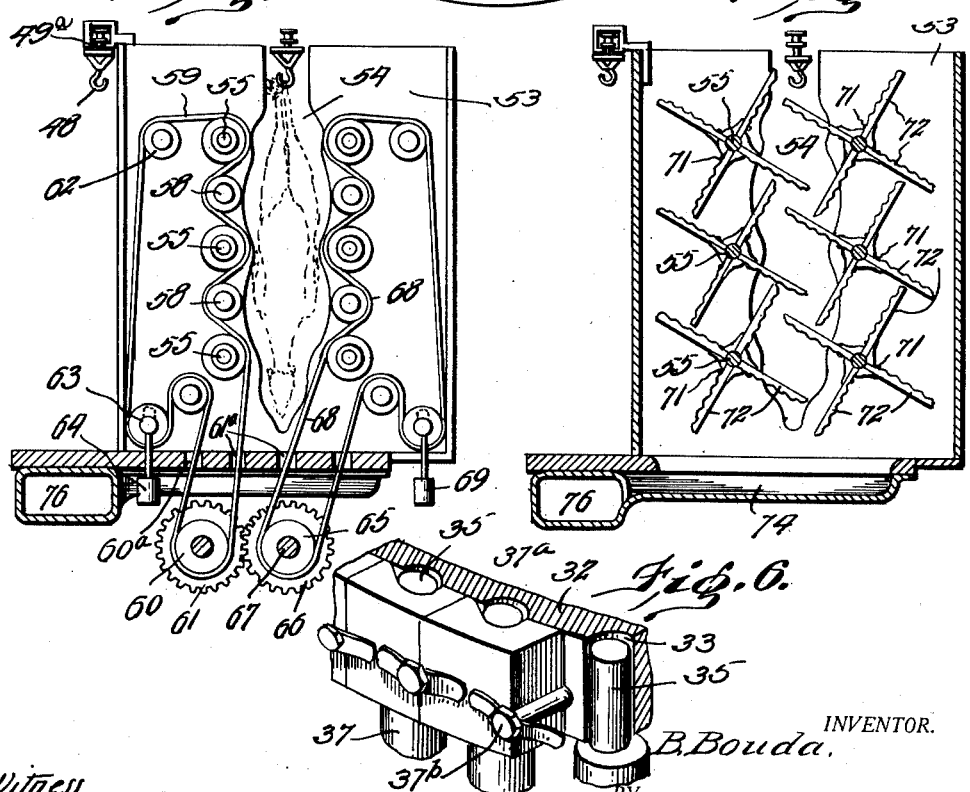
INVENTOR.
B. Bouda,
ATTORNEY.

UNITED STATES PATENT OFFICE.

BOHUMIL BOUDA, OF AUSTIN, MINNESOTA.

APPARATUS FOR CLEANING POULTRY.

1,372,595.  Specification of Letters Patent.  Patented Mar. 22, 1921.

Application filed October 4, 1920. Serial No. 414,604.

*To all whom it may concern:*

Be it known that I, BOHUMIL BOUDA, a citizen of the United States, residing at Austin, in the county of Mower, and State of Minnesota, have invented certain new and useful Improvements in Apparatus for Cleaning Poultry, of which the following is a specification.

This invention relates to a machine or apparatus for cleaning poultry.

The primary object of my invention is the provision of a power operated machine which will pluck the feathers of poultry without bruising or otherwise injuring the flesh of the animal and means for removing the feathers from the apparatus.

Another object of my invention is directed to a machine or apparatus of the above class which will automatically and continuously remove the feathers of poultry including an endless conveyer driven by the power operating mechanism which drives the cleaning mechanism.

A still further object of my invention is directed to a poultry cleaning machine and means to automatically revolve the poultry during the cleaning operation.

One of the objects of my invention resides in an automatical poultry cleaning apparatus of the above class for adjusting the cleaning members.

Another object of my invention relates to a power operated poultry cleaning machine wherein a number of animals may be automatically conveyed to a cleaning mechanism in rapid succession and auxiliary brushing or scraping means driven by the power operating means.

Another object of the invention resides in a power operated poultry cleaning machine of the above class wherein the feathers of a number of animals may be removed in rapid succession and subsequently brushed or scraped from the animals and means for continuously withdrawing the cleanings from the apparatus.

With these objects in view and others which will be manifest and suggested as the nature and purpose of my invention are revealed in the following specification and drawing wherein I have shown a practical, yet preferred embodiment thereof:

Figure 1 is a plan view of the apparatus.

Fig. 2 is a side view of the same.

Fig. 3 is a view partly in section showing the coöperating cleaner rollers.

Fig. 4 is an end view partly in section of the brush mechanism and its operating means.

Fig. 5 is a similar view to Fig. 4 showing the arrangement of the rubber beaters on the brush mechanism.

Fig. 6 is an end view partly in section of the cleaner rollers and their mounting.

Fig. 7 is a perspective view of a corrugated cleaner roller shown broken away.

Similar numerals in the specification referring to corresponding parts on the drawing, 1 designates a frame or bed in which the cleaning mechanism is mounted, an electric motor 2 communicating power to a driven shaft 3, pulleys 4, 5 and a belt 6 which drive a longitudinally extending shaft 7 supported in suitable bearings 8, 9 beneath the frame or bed by suitable brackets. A blower tube 10 communicating with the interior of the apparatus and a driven fan 11 on the shaft 3 is adapted to force the cleanings into a plurality of spouts 12 to which sacks or bags (not shown) are clamped to receive the feathers, etc., from the cleaning apparatus now to be described.

The beveled gear 13 keyed on the shaft 7 meshes with the bevel gear 14 of a driven shaft 15 which extends vertically through upper and lower sleeves 16, 17 of the bosses 18, 19 into a circular housing 20. Upper and lower spiders 21, 22 keyed on the vertical shaft 15 rotatably support a plurality of cylinders 23 each of which is provided with a fluted, rubber sleeve 24 so as to lessen vibration and also coöperate with a second set of rollers presently to be described. Suitable friction devices 25, 26 are provided for each of the spiders to insure the free movement of the fluted rollers about the shaft 15. The said shaft 15 is provided with a spur gear 27 which meshes with pinions 28, 29, 30 of the fluted rollers to thereby rotate the same.

A vertical bracket 31 on the bed or frame 1 supports a circular top plate 32 in which is journaled in suitable bearings 33, 34 the reduced ends 35, 36 of a plurality of corrugated, vertical cleaning rollers 37 which gradually decrease in diameter about the circular plate 32 as clearly shown in Fig. 3.

The reduced ends of the corrugated rollers 37 are secured in their bearings by grooved blocks 37ª which are clamped together by adjustable fastening elements 37ᵇ whereby the rollers may be adjusted with respect to the fluted rollers above referred to.

The vertical bracket 31 is provided with a suitable hand hole so that access to the housing may be had in case the gearing or fluted rollers should become clogged with refuse. A wire netting 38 is provided on the outside of the corrugated rollers to protect the birds being cleaned, and a plurality of springs 39 secured as at 40 to the circular outer casing 41 are adapted to press the birds toward the wire netting so that the feathers will be drawn through the same to the cleaner rolls 37 and the coöperating fluted rollers.

The outer circular casing 41 defines a guide way 42 around which the birds are carried on an endless chain by the mechanism and in the manner now to be described.

A second bevel gear 43 rotatable with the shaft 7 meshes with a bevel gear 44 mounted on the lower end of a vertical shaft 45 which passes upwardly through the bed 1, the said shaft being provided at its upper extremity with a large sprocket 46 about which a sprocket chain 47 constituting an endless conveyer extends forwardly to a large sprocket 47ª on the vertical shaft 15. Idlers 49ª, 50 supported by brackets 51, 52 on the front wall of an opening housing 53 provide the necessary tension for the sprocket chain 47 which passes through a guide 52ª on the side wall of the housing.

Suspended at spaced intervals on the sprocket chain 47 are slings or hooks 48 which are preferably formed integral with swivel connections 49 so that the birds may be completely turned about as they are held close to the coöperating cleaning rollers above described, the swivels being provided with small pinions 50 which engage the teeth 48ª on the plate 32 as shown clearly in Fig. 1.

The housing 53 which is supported on the frame 1 between the vertically driven shafts 15, 45 is provided with a central passage 54 intermediate its sides, sufficiently cut away and shaped to permit the birds suspended from the hooks to pass therethrough, the said chain operating directly over the said passage and between a set of brushing elements as seen in Figs. 4 and 5.

A plurality of longitudinal, vertically spaced shafts 55 mounted in journal bearings 56, 57 on each side of the passage 54, are driven by sprockets and an endless chain 58, 59 driven from a sprocket and spur gear 60, 61 on the shaft 7, the said endless chain passing through apertures 60ª, 61ª on the bottom of the housing. Idlers 62, 63 about which the endless chain 59 passes and a weight 64 suspended from the vertically adjustable idler 63 in the frame of the said housing is adapted to keep the endless chain 59 under tension as is well known. A similar sprocket and gear 65, 66 which meshes with the gear 61 below the frame is supported by a bracket and stub shaft 67 and operates a similar set of longitudinal, vertically spaced shafts and sprockets by a second endless chain 68 also held under tension by suitable idlers and a weight 69. Keyed on each of the shafts 55 are a plurality of equally spaced spiders 70 to which are fastened by bolts 71, removable beaters 72, preferably of rubber or flexible material, the beaters on the intermediate shaft 55 being positioned between the beaters on the upper and lower longitudinal shafts shown in Fig. 2. As the shafts are rotated, the beaters brush or scrape off the fine feathers or particles clinging to the birds and as they fall through the open bottom 73 into the pan 74 are drawn by suction through the tubing 75 into the conduit 76 and subsequently into the spout 12.

In the operation of the machine, blood cups are first placed on the heads of the birds which are suspended by their feet from the hooks 48 traveling between the sprockets 46 and the idler 50.

As the birds travel into the guideway 42, they are pressed slightly toward the screen 38 by the springs 39 and the fan blower 11 and as the feathers are drawn through the screen between the rollers 37, they are caught by the revolving fluted, rubber cylinders 23 which gives the feathers a quick jerk. The swivel connections and the pinions thereon permit the birds to be turned as they travel along and the feathers removed. The operating mechanism for the endless chain carrying the swivels and hooks is driven from the electric motor 2 through the sprockets 46, 47ª on the vertical shafts 45, 15 which are in turn driven by the longitudinal shaft 7. As the chain 47 carries the birds between the beaters 72 on the shaft 7, it will be seen that the birds are further cleaned by the revolving rubber beaters and may then be removed from the hooks. The fan 11 causes a continuous circulation of air in the apparatus which performs the double function of pressing the birds toward the cleaning rollers and also removing the feathers and cleanings, thereby always keeping the apparatus free from any dirt or waste matter. The rollers 37 may be adjusted with respect to the fluted rollers by loosening or tightening the clamps 37ᵇ and the birds are fully protected from the said rollers by the wire screening.

In the accompanying drawings, I have illustrated my invention embodied in one form by way of example, and which in practice has been found to be highly satisfactory in obtaining the desired results. It will be obvious however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is;

1. In a poultry cleaning machine of the class described, power operating means, an endless conveyer driven by said power operating means, swivel connections and hooks carried by said endless conveyer for supporting the poultry, a plurality of vertical cleaning elements operated by said endless conveyer and vertical rollers coöperating with said cleaning elements for removing the feathers from the poultry.

2. In a poultry cleaning machine of the class described, power operating means, an endless conveyer driven by said power operating means, means carried by said conveyer for supporting the poultry to be cleaned, rotatable cylinders driven by said power operating means, a plurality of freely rotatable rollers coöperating with said cylinders and said conveyer and a guideway about which the poultry is adapted to travel.

3. In a poultry cleaning machine of the class described, power operating means, an endless conveyer carrying supporting hooks, rotatable fluted cylinders driven by said power operating means, a plurality of corrugated vertical rollers coöperating with said cylinders and said endless conveyer, a screen for protecting the poultry and means for pressing the poultry toward the said screen and rollers during the cleaning operation.

4. In a poultry cleaning machine of the class described, power operating means, an endless conveyer carrying supporting hooks, rotatable fluted cylinders driven by said power operating means, a plurality of adjustably mounted corrugated rollers coöperating with said cylinders and said endless conveyer, a screen for protecting the poultry from said rollers, a guideway, and means attached to said guideway for pressing the poultry toward the screen during the cleaning operation.

5. In a poultry cleaning machine of the class described, power operating means, an endless conveyer carrying supporting hooks, rotatable, fluted cylinders driven by said power operating means, a plurality of rotatable corrugated, rollers diminishing in diameter coöperating with said cylinders and endless conveyer, a screen for protecting the poultry from the corrugated rollers, a circular guideway, and spring attaching means secured to said guideway for pressing the poultry toward the screen.

6. In a poultry cleaning machine of the class described, power operating means, a driven fan and an endless conveyer driven by said means, rotatable, fluted cylinders also driven by said power operating means, freely rotatable, corrugated rollers diminishing in diameter and coöperating with said cylinders and said endless conveyer, a screen protecting the poultry from the corrugated rollers, a circular guideway, spring attaching means secured to the guideway for pressing the poultry toward the screen, and means for automatically removing the feathers from the machine during the cleaning operation.

7. In a poultry cleaning machine of the class described, power operating means, a driven fan and a conduit communicating with said fan and the machine, an endless conveyer and rotatable fluted cylinders also operated by said operating means, freely rotatable corrugated rollers diminishing in diameter and adjustable with respect to said fluted cylinders, a screen outside of said rollers for protecting the poultry during the cleaning operation, a circular guideway, resilient means attached to the guideway for pressing the poultry toward the screen and said rollers and auxiliary means whereby the draft created by said fan will also press the poultry toward the cleaning elements and remove the feathers from the machine.

8. In a poultry cleaning machine of the class described, power operating means, an endless conveyer driven by said means, cleaning rollers coöperating with said endless conveyer, and auxiliary brushing elements for removing the feathers from the poultry after they have been picked by the rollers.

9. In a poultry cleaning machine of the class described, power operating means, an endless conveyer driven by said means, cleaning rollers coöperating with said endless conveyer, and auxiliary brushing elements also driven by said power operating means for removing the feathers from the poultry after they have been picked by the rollers.

10. In a poultry cleaning machine of the class described, power operating means, an endless conveyer driven by said means, cleaning rollers coöperating with said endless conveyer, auxiliary brushing elements also driven by said power operating means, said conveyer being driven between the brushing elements whereby the feathers from the poultry are removed after they have been picked by the rollers.

11. In a poultry cleaning machine of the class described, power operating means, an endless conveyer driven by said means, cleaning rollers coöperating with said endless conveyer, rotatable brushing elements driven by said power operating means, said conveyer being driven between the rotatable brushing elements whereby the feathers from the poultry are removed after they have been picked by the rollers, and automatic means for withdrawing the feathers from the machine.

12. In a poultry cleaning machine of the class described, power operating means, an endless conveyer driven by said means, cleaning rollers coöperating with said endless conveyer, rotatable brushing elements driven by said power operating means, a housing inclosing said brushing elements, said conveyer being driven longitudinally of the housing whereby the poultry carried by said endless conveyer are engaged by the rotatable brushing elements, and automatic means for withdrawing the feathers from the machine.

13. In a poultry cleaning machine of the class described, power operating means, an endless conveyer driven by said means, cleaning rollers coöperating with said endless conveyer, a housing, longitudinally spaced, vertical shafts journaled in said housing, a plurality of beaters constituting brushing elements carried by said shafts, said conveyer being driven longitudinally of the housing whereby the poultry carried thereby are engaged by the beaters, and automatic means for withdrawing the feathers from the machine.

14. In a poultry cleaning machine of the class described, power operating means, an endless conveyer driven by said means, cleaning rollers coöperating with said endless conveyer, a housing, a longitudinal passage extending throughout the length of said housing, said conveyer being driven through said passage, a plurality of vertically spaced, removable beaters rotatable across said passage whereby the feathers are removed from the poultry after they have been picked by the rollers and automatic means for creating a draft of air within the machine to withdraw the feathers.

In testimony whereof, I affix my signature hereto.

BOHUMIL BOUDA.